Figure 1:
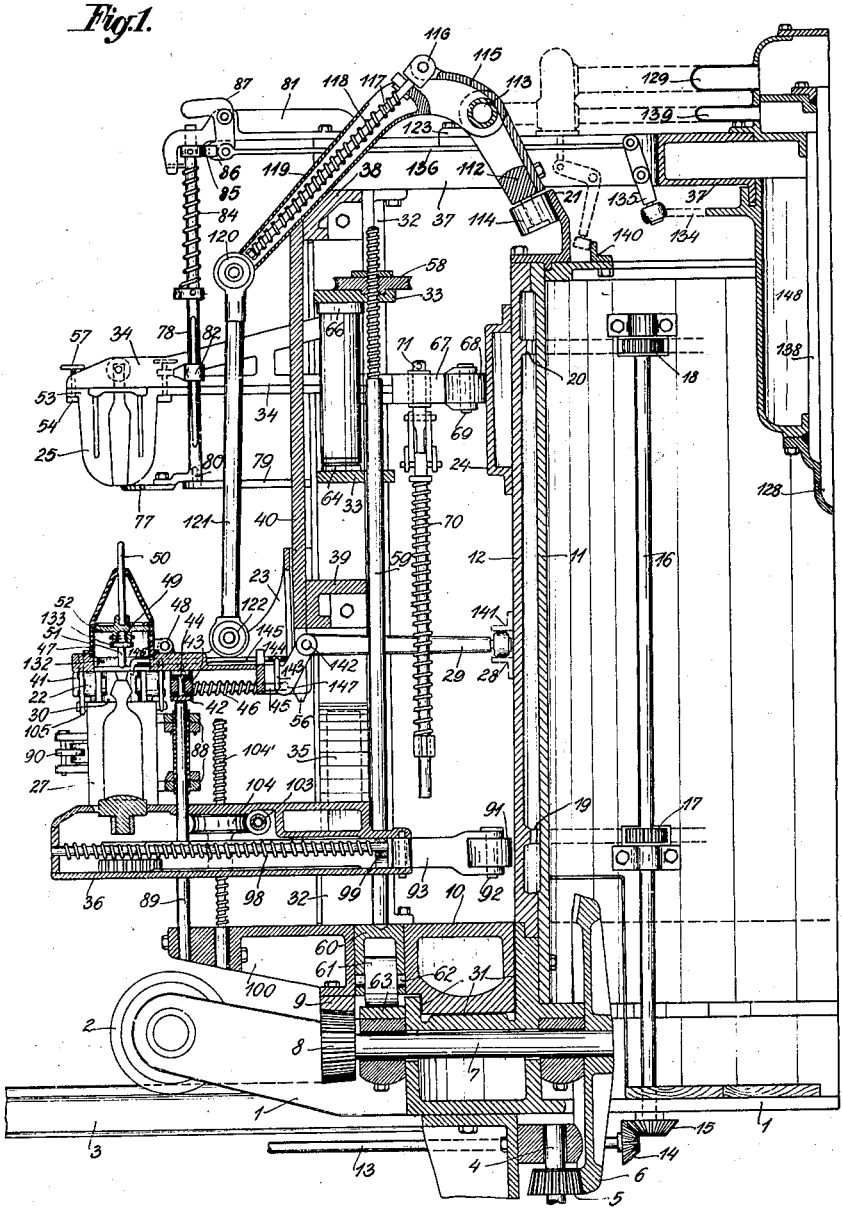

Feb. 18, 1930. H. HILLMANN 1,747,438

AUTOMATIC BOTTLE BLOWING MACHINE

Original Filed Dec. 14, 1921 6 Sheets-Sheet 6

Inventor:
Hans Hillmann
By Davis & Davis
Attys

Patented Feb. 18, 1930

1,747,438

UNITED STATES PATENT OFFICE

HANS HILLMANN, OF GROSS-RASCHEN, GERMANY, ASSIGNOR OF FIFTY-TWO ONE-HUNDREDTHS TO THE FIRM HALLESCHE PFANNERSCHAFT ABTEILUNG DER MANSFELD AKTIENGESELLSCHAFT FÜR BERGBAU UND HUTTENBETRIEB IN EISLE-BEN, HALLE-SAALE, GERMANY

AUTOMATIC BOTTLE-BLOWING MACHINE

Application filed December 14, 1921, Serial No. 522,320, and in Germany December 18, 1920. Renewed April 4, 1927.

More particularly my invention relates to machines of the type in which a plurality of blowing heads are mounted on a rotary frame for being successively brought into position for taking charges of glass from a suitable bath and blowing the same in the moulds. One of the objects of the improvements is to provide a machine of this type by means of which bottles of the smallest and largest dimensions can be blown. With this object in view my invention is based on the principle that this universality in bottle blowing machines can be obtained only if means are provided for adapting the operation to the period of time required for cooling the glass taken from the moment of sucking the glass into the preliminary mould to the time of completing the bottle within the main or final mould. It will be understood that with the same velocity of the machine the time of cooling taken from the moment of sucking in the glass and completing the bottle depends on the angle through which the machine must be turned for taking in the glass and placing the same into the final mould. Therefore the improvements consist in constructing the machine in such a way that the said angle through which the machine is turned can be varied, preferably by displacing the mould operating members relatively to each other and circumferentially of the machine. In the preferred embodiment the operating members controlling the operations following the sucking in of the glass are disposed on a common shiftable support, and the member controlling the sucking action is fixed on the frame of the machine. Therefore the time required for cooling is varied by shifting the said support with the controlling members provided thereon towards and away from the member controlling the sucking action. The controlling members provided on the support are for example in the form of cams adapted to open and close the neck mould, the preliminary mould and the final or main mould, a cam for imparting a partial rotary movement to the neck moulds relatively to the final moulds and a cam for moving the neck moulds towards the final moulds.

By thus setting the support of the said controlling cams the time interval taken from the moment of sucking in the glass and carrying the same to the final mould can be increased and reduced without varying the number of revolutions of the machine. Therefore I am enabled to adapt the machine to the time required for cooling the smallest bottles without operating the same at an objectionable speed.

In the operation of machines of the class referred to it is desirable to transmit the glass from the preliminary mould to the final mould at increased velocity, because small bottles are blown from very fluent glass and the mass of fluent glass is liable to be drawn out or torn from the mould if the time of the transmission of the glass is too long. Therefore a further object of the improvements is to construct the means for transporting the glass from the preliminary mould to the final mould in such a way that they can be operated at high speed. For this reason the said means are made with a low weight, and the weight is the same when making bottles of large and small sizes. In the practice of this part of the invention it would be objectionable to move the final woulds to the neck moulds, because the weight of the final moulds and their carriers is high particularly in case of bottles of large sizes, so that such parts can not be moved at the desired velocity. Therefore I transport the glass by means of the smallest one of the moulds which is the neck mould.

I am aware that it is known in machines provided with suction moulds to carry the glass from the suction or preliminary mould to the final mould by means of a movable neck mould. However, in such machines the preliminary mould is disposed below the final mould, and the neck mould is moved upwards together with the glass. This construction can not be used in my universal machine for the reason, that my machine is designed to blow bottles of the smallest size, and the upward movement of the neck mould must be accelerated to such an extent that the glass would be torn from the neck mould. Therefore in my improved machine the preliminary mould is disposed above the final mould and for transporting the rope of glass the neck mould moves downwards through the open arms of the preliminary mould and on the final mould. I have found that when thus operating the machine the glass rope is not torn off. In addition I obtain a machine of simple construction because the neck mould moves downwards by gravity and special operating means may be dispensed with. This feature is particularly important in the manufacture of bottles of large size by reason of the high weight of the glass body.

My universal machine is adapted to be equipped with preliminary moulds of different sizes, and therefore the stroke of the moulds is different. To provide for different strokes of the moulds I support the preliminary moulds on a track which is vertically adjustable on the frame of the machine.

Furthermore the machine is constructed in such a way that final moulds of different height can be mounted thereon. To provide a simple construction permitting the use of sectional moulds of similar form I construct the final moulds for being rocked about a pivot which is secured to the rotary frame of the machine, and I support the same on a plate which is adjustable in vertical direction.

When manufacturing bottles of small size the glass must be more fluent than when making bottles of large size. To adapt the machine to these different conditions I provide a subsidiary bath communicating with the main bath, and in front of each suction mould I arrange a stripping member for automatically removing the uppermost layer of glass cooled by the air and the preliminary mould and returning the same into the main bath. The stripping member is vertically adjustable, so that the uppermost layer can be removed to varying depths. In the manufacture of small bottles requiring a fluent and hot glass the stripping member is set for extending into the bath to comparatively great depth and completely removing the cool layer. In the manufacture of large bottles a smaller amount of the uppermost layer is removed, so that a comparatively cool and thick glass is drawn in by suction.

In the operation of my improved universal machine it is important that small moulds having a small diameter and large moulds can readily be applied to the arms carrying the preliminary moulds and that the mould sections can be set in their proper positions while the machine is in operation. For this reason the arms of the preliminary mould are fixed to the machine, and the mould sections are connected to the said arms by clamps which can readily be mounted and dismounted and which can be set relatively to the arms of the preliminary moulds according to different sizes thereof.

My invention also relates to the blowing apparatus proper which is adapted in its function to the different sizes and forms of the bottles to be manufactured. Particular care must be taken that bottles of small size are thoroughly blown out. To permit of an easy operation of the blowing means I provide above the neck mould a cylinder and a piston carrying the neck plug, which is adapted to be forced into or retracted from the neck mould by the vacuum or the air pressure produced within the mould respectively for drawing in the glass or blowing out the bottle.

I have found that it is not advisable to dispose the cams controlling the suction and pressure conduits on the part of the machine which is adjustable. In my improved machine these cams are disposed within the stationary part of the construction, and they are adjustable independently of all the other cams. The cams are so mounted as to be readily accessible, for which reason the machine is in the form of a rotary frame comprising a cylinder the dimension and construction of which are such that the attendant is able to get into the cylinders and adjust the cams. Therefore the cams, such as the suction and blowing cams 124 and 140, disposed at the upper part of the cylinder can easily be adjusted, and the attendant does not suffer from the heat of the machine. Furthermore this construction is important because the parts carrying the cams are in the form of segments rigidly or adjustably mounted on the cylinder.

An important feature of the invention resides in providing means for manufacturing seamless bottles. With this object in view I provide means for opening the final or main mould after a short blowing, means for turning the main mould and the neck mould carrying the bottle relatively to each other, and means for closing the final mould for completing the blowing of the bottle. I wish it be understood, that this method of blowing bottles is new, and therefore I also claim the method.

Figure 2:
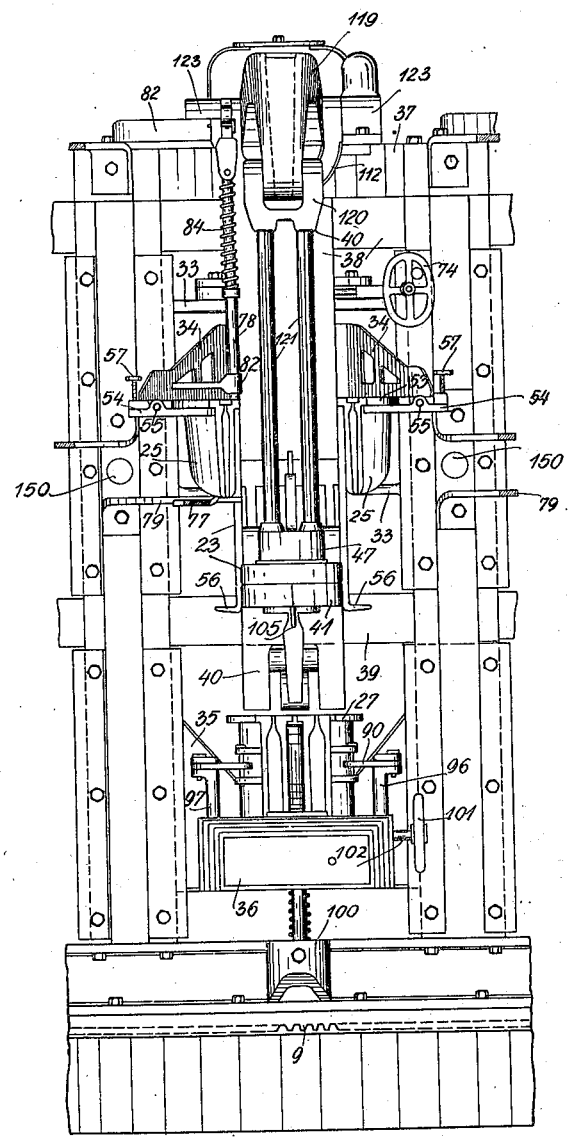
Figure 3:
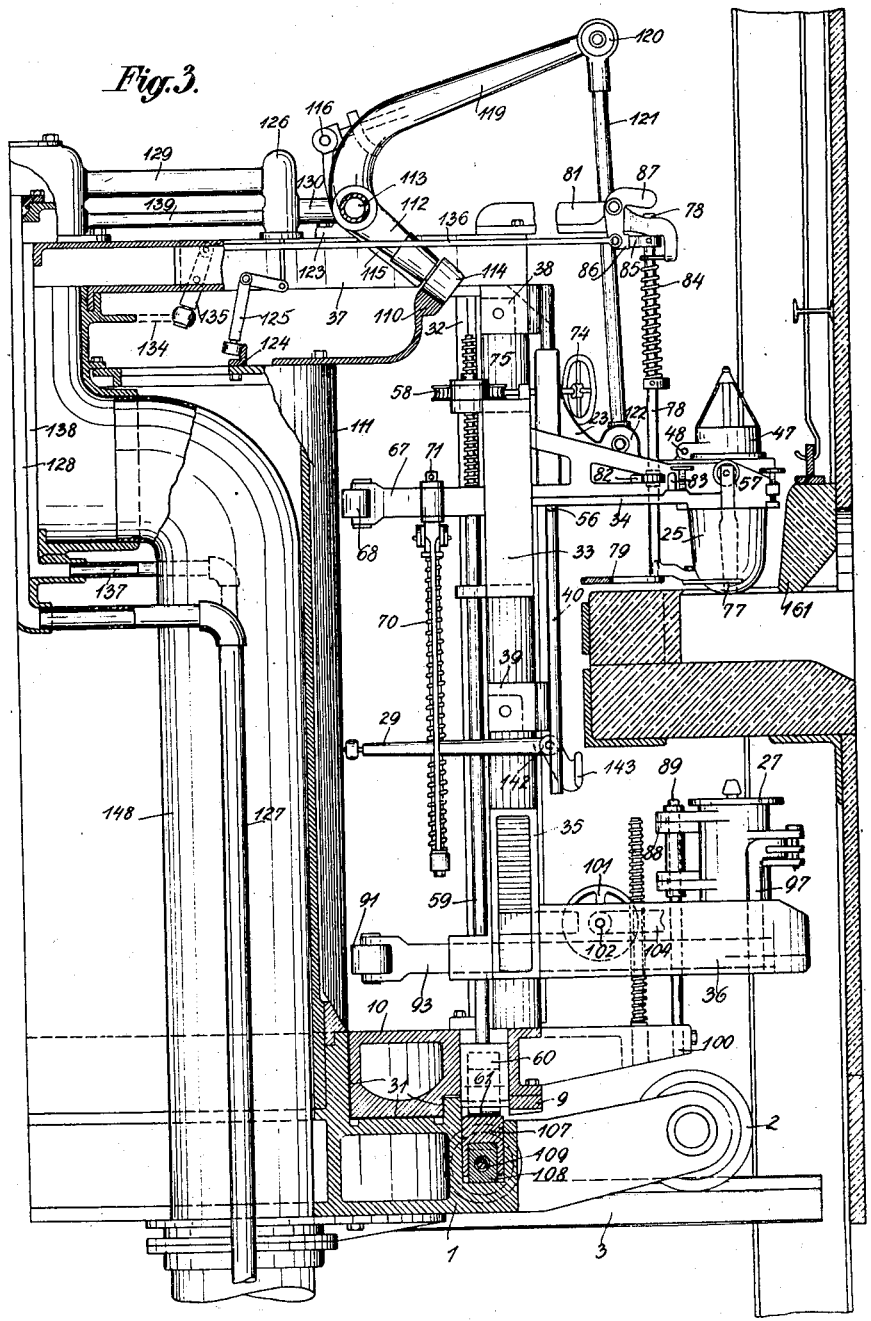
Figure 4:
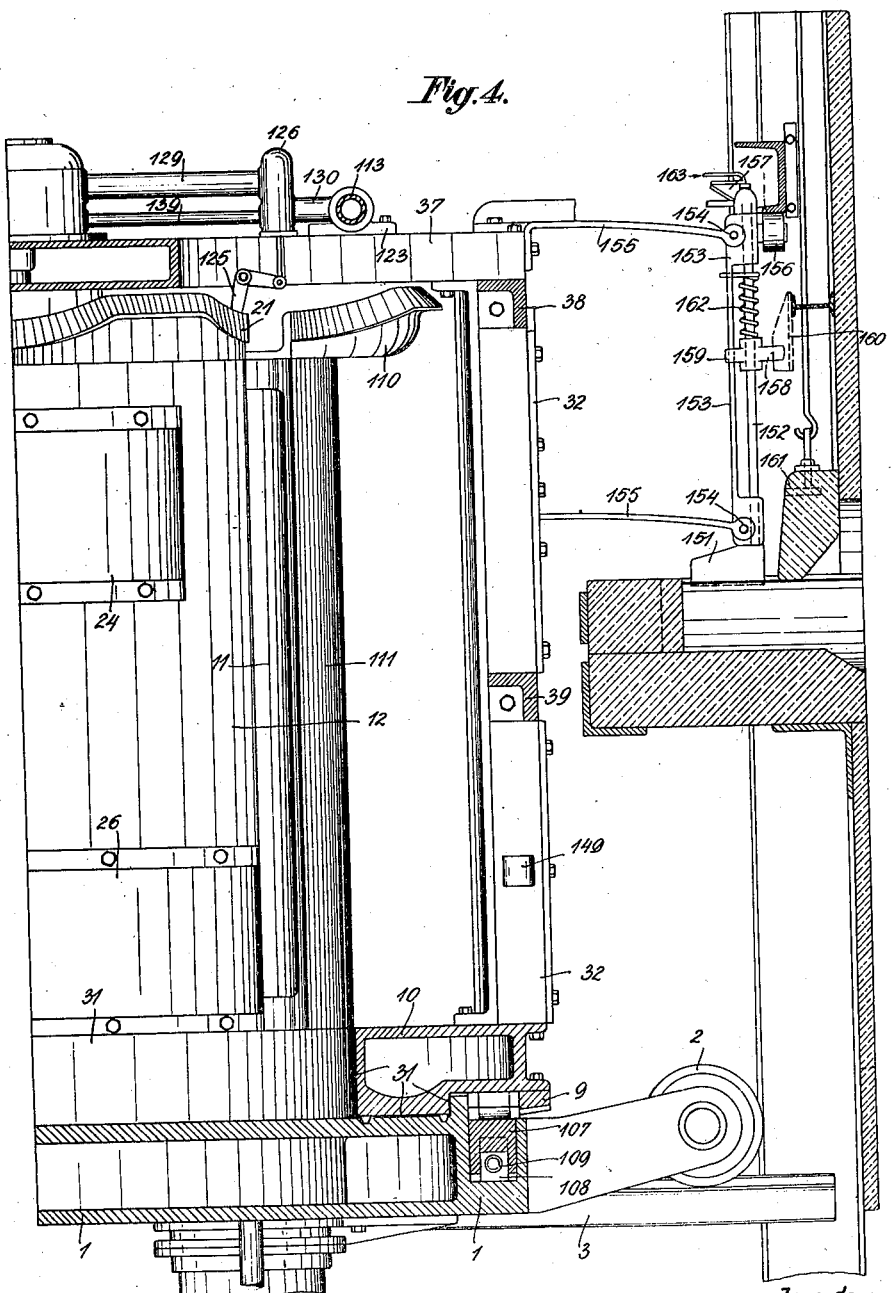
Figure 5:
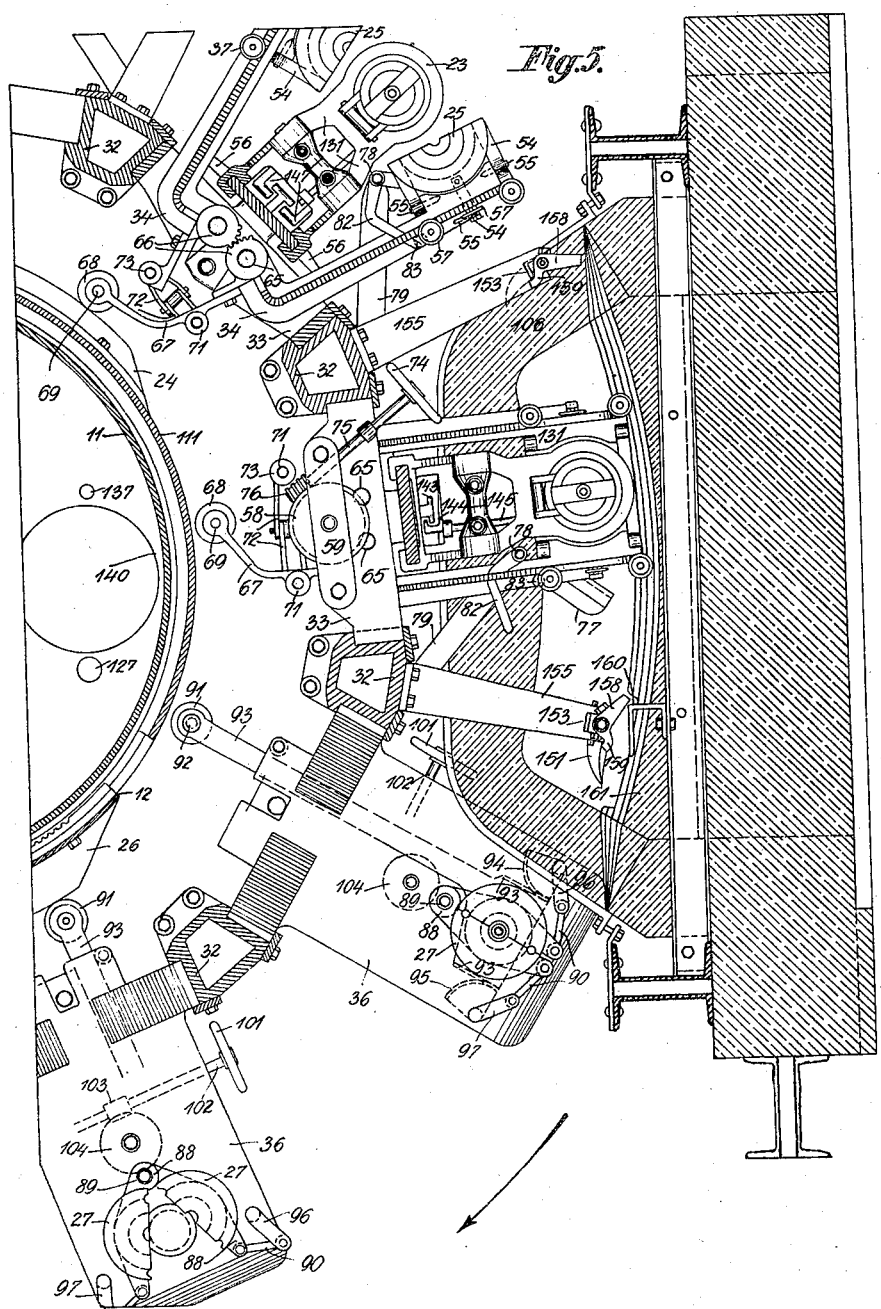

In order that the invention be more clearly understood an example embodying the same has been shown in the accompanying drawings, in which the same reference characters have been used in all the views to indicate corresponding parts. In these drawings, Fig. 1, is a central vertical section through one half of the machine, showing the position of the sets of moulds relatively to each other during the blowing operation, Fig. 2, is a front elevation of a complete head of the machine, showing the preliminary mould and the main mould open, and the neck mould in the descending position with the glass blank;

Fig. 3, is a side elevation of the other half of the machine, partly in vertical section;

the neck mould is in its highest position and the preliminary mould closed and under the same, both moulds being lowered down to the glass surface for the purpose of filling with liquid glass;

Fig. 4, shows the same section of the machine, the sets of moulds with their supports being omitted. The central non-rotating cylindrical part of the machine is shown in elevation with the stripper lowered. Moreover this view shows the arrangement of the preliminary bath relatively to the main bath in vertical section;

Fig. 5, is a plan view partly in section, the non-rotating cylindrical frame being shown in a section taken substantially along the middle of its height, and the different heads being shown in sections taken on lines of different height. In the uppermost head of the machine shown in this figure the preliminary moulds with their arms are shown open. The neck mould with the carriage is shown at the moment of sliding upwards.

In the next head, the preliminary moulds under the neck mould are closed and both lowered down to the glass surface. In the field of the third head, the support of the main mould is shown, with the latter closed.

In the next head the main mould is open.

Figure 6:
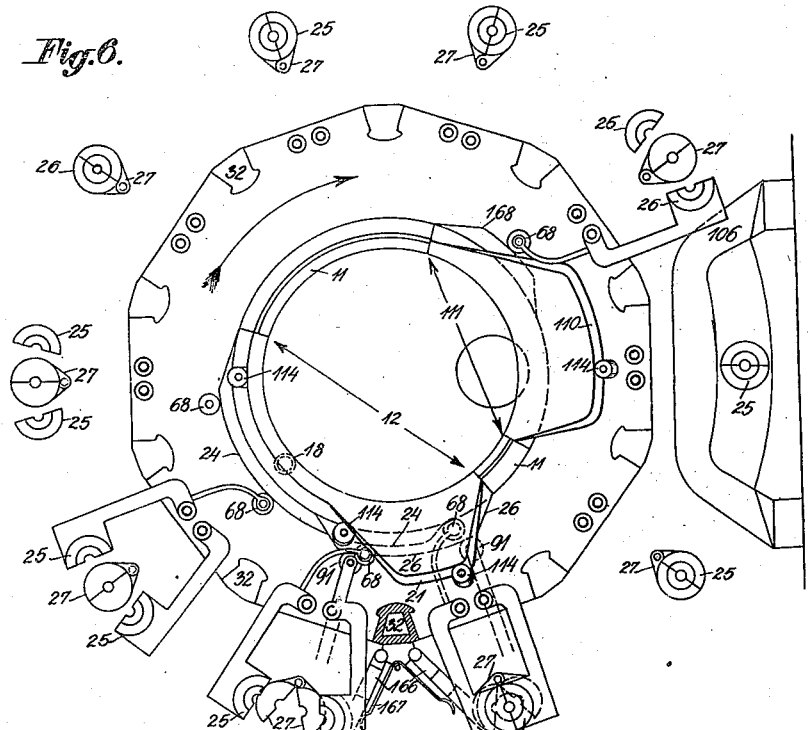
Figure 7:
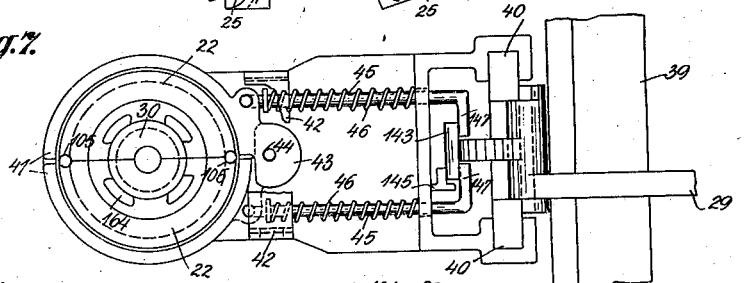
Figure 8:
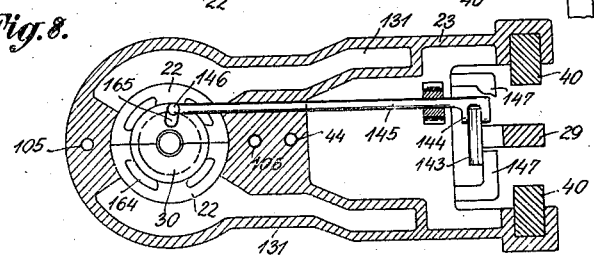

Fig. 6, is a diagrammatical plan view of the machine showing the fixed and adjustable segments provided with the cams for operating the mould, Fig. 7, is a bottom view of the slide carrying the neck mould and the operating mechanism of the sections of the neck mould, and Fig. 8, is a horizontal section of the said slide taken at the height of the rod 145.

In the example shown in the drawings, the machine comprises a frame 1 which travels by means of wheels 2 on rails 3 and which can be moved towards and away from the bath. To the bottom side of the frame 1 a motor (not shown) is secured which by means of a shaft 4, bevel wheels 5, 6, spindle 7, and a bevel wheel 8, drives a toothed rim 9 secured to the annular bed plate 10 of the rotary frame of the machine.

The central part of the machine comprises a cylinder 11 secured to the frame 1 and surrounded by an adjustably mounted cylinder segment 12 which can be brought into the desired position relatively to the cylinder 11 by operating a spindle 13, bevel wheels 14, 15, spindle 16, and gear wheels 17, 18 meshing with internally toothed rims 19, 20 of the cylinder segment 12. The construction of the operating mechanism for the adjustable segment 12 is shown in Fig. 1, but it will be understood that it is in practice located on the opposite section of the machine.

To the adjustable cylinder segment 12 are secured:—

(a) a curved cam rail 21 which brings about the up and down sliding of the neck mould 22 and the carriage 23 supporting the same;

(b) a cam 24 which bring about the opening and closing of the preliminary mould 25;

(c) a cam 26 which produces the opening of the main mould 27;

(d) a tappet 28 which by the downward movement of a lever 29 opens the neck mould 22 or by the upward movement of the lever 29, turns the central part 30 of the neck mould 22 for the purpose of obliterating the seam to thus produce seamless bottles (Fig. 1).

The bed plate 10 of the rotary frame of the machine is chiefly constituted by a large annular slide member 31 supporting the rotary frame.

To the bed plate 10 vertical supports 32 are secured between each pair of which slides a bar 33 supporting a pair of the preliminary mould arms 34, and also guide-bars 35 of the main mould support 36 are guided for sliding upwards and downwards. On the supports 32 a star-shaped hollow top part or cover 37 of the machine is supported. Between each pair of the supports 32 are arranged crosspieces 38 and 39 carrying the upright guide-way 40 for the carriage 23 of the neck mould 22.

The sections of the mouth piece mould 22 are inserted in the usual manner into arms 41 (Figs. 1 and 7). After turning down the bracket or shackle 42, these arms 41 are pushed with their joints 43 over a small spindle 44, whereupon the bracket or shackle 42 is again turned up. Two pressure bolts 45 are then laterally engaged by means of compressed springs 46 with the neck mould arms 41, owing to which the neck mould sections 22 are firmly pressed together.

Above the neck mould a cylindrical casing 47 is provided which is adapted to be rocked backwards and away from the mould about a pivot pin 48, for retracting a piston 49 with its guide spindle 50 and a neck plug 51 inserted into socket 52. Thereafter the whole is brought back again into working position. The construction is such that the neck plug is drawn downwards by the vacuum produced within the mould when taking in the glass, and that it is thrown upwards by the pressure of the air produced for blowing the bottle. Therefore special operating mechanism for the plug may be dispensed with.

The preliminary mould sections 25 are provided with flanges 53 resting on double-armed clamping levers 54. These levers 54 are rockingly mounted on bolts 55 secured to the preliminary mould arms 34.

When the neck mould 22 has been brought to the highest position, lateral projections 56 of the carriage 23 engage under the preliminary mould arms 34, and the said arms 34 with the preliminary mould 25 having been closed under the neck mould 22, the preliminary mould sections 25 are clamped in vertical and closing position relatively to each other and to the neck mould 22 by means of set screws 57 provided at the outer end of the levers 54 (Figs. 2 and 5).

The sliding frame 33 is supported on a roller 61 through the intermediary of a worm wheel 58, a screw-threaded supporting rod 59 and a sliding head 60 (Fig. 3). The roller 61 rotates about a shaft 62 mounted in the sliding head 60 and rolls on a horizontal circular track 63 of the frame 1.

The preliminary mould arms 34 rest in ball bearings 64 on the sliding frame 33 and are rockingly mounted on pins 65, in such a manner that on one arm 34 being opened toothed wheel segments 66 cause the other arm to be also opened. The opening is effected by means of a lever 67 secured to one of the mould arms 34. When the rotatable frame of the machine rotates, a roller 68 mounted on a pin 69 travels on the cam surface 24 or cam 168 and is thus forced radially outward. Owing to this movement, in addition to the opening of the preliminary mould 25 the upper ends of a toggle joint 72 having its links jointed to bolts 71 secured to the mould arms 34 are pushed together for forcing the toggle joint downwards in opposition to a spring 70 (Figs. 1 and 5). When the roller 68 leaves the cam surface 24 or 168, the spring 70 will act on the lever 67 and an arm 73 connected to the other one of the preliminary mould arms, and thus normally close the preliminary mould 25.

By rotating a hand-wheel 74 keyed to a spindle 75 of a worm 76, the worm wheel 58 is turned and the latter brings the sliding frame 33 with the preliminary moulds 25 into the correct vertical position relatively to a knife 77 (Figs. 1, 2 and 5). The knife 77 is secured to the bottom part of a spindle 78, which is supported by a leaf spring 79 and rotatably mounted between a pin 80 and an arm 81. On the preliminary mould arm 34 being opened, a lever 82 (Fig. 5) connected by groove and spline to the spindle 78 is rocked by a stop 83, so that the knife is turned aside and a spring 84 is cocked until a stop 85 secured to the spindle, engages behind a tooth 86 of a lever 87 (Figs. 1 and 3).

The main mould sections 27 are jointed with their links 88 to a spindle 89, and the links 90 required for opening and closing the mould 27 are jointed to the links 88 and arms 96, 97 (Fig. 5).

During the rotation of the machine, a roller 91 rides on the cam face 26 and transmits its motion through a bolt 92 to a toothed rack 93 which engages with toothed segments 94, 95 and thus rocks the arms 96, 97 (to which they are connected) for opening the mould (Figs. 1 and 5). By the said operation, a spring 98 is compressed by a projection 99 of the toothed rack 93, owing to which, after the cam surface 26 has been passed, the main mould 27 is again firmly closed.

For setting the main mould 27 relatively to the neck mold 22, the carriage 23 must be in the lowest position, and the bracket 42 must rest firmly on the spindle 89 which is supported by a bracket 100 of the bed plate 10.

By turning a hand wheel 101 and therefore a spindle 102 and a worm 103, a worm wheel 104 screwing on a screwthreaded spindle 104' secured to the bracket 100 is rotated, so that the main mould support 36 is raised or lowered until the main mould 27 and the neck mould 22 properly join together. A lateral shifting of these two sets of moulds relatively to each other is prevented by locking pins 105 of the carriage 23.

When the rotary frame of the machine is started the manufacture of the hollow glass body begins with the suction of the liquid glass (Fig. 3) into the preliminary mould and the neck mould 22, the said operation taking place in the following sequence:—

1. As soon as the neck mould 22 and the preliminary mould 25, both in closed position and placed on each other so as to form a tight joint, have passed beyond the margin of the preliminary bath at 106 and reached the glass surface, the supporting roller 61 descends from the fixed circular track 63 and passes on to a portion 107 of the track situated at a lower level, owing to which the supporting rod 59 of the sliding track, the preliminary mould arms 34, the preliminary mould 25 and the stops 56 engaging the carriage 23 and the neck mould 22 will descend by gravity against the action of springs 115 and 118. The partial track is vertically adjustable to a slight extent by means of two supporting wedges 108 which can be moved toward or away from each other by turning a screw 109 with right and left hand thread. This adjustability of the track portion 107 is necessary, as the glass surface in the main bath, and therefore also in the preliminary bath, is not always at the same level, and during the return movement of the machine, the preliminary mould 25 must be carried over the margin of the preliminary bath. The slide 23 with the neck mould 22 is supported indirectly by a cam rail 110 fixed to the stationary cylinder segment 111 rigidly secured to the inner cylinder 11 (Fig. 3). Into the end of a bifurcated lever 112 rockingly mounted on a tubular pivot bolt 113 is inserted by means of a pin, a roller 114 resting on the cam rail 110 (Figs. 1, 2 and 3); moreover to the said lever 112 a powerful leaf spring 115 is bolted which bears on the tubular spindle 113 and carries, by means of a link 116, a spindle 117, and an equalizing spring 118, a bifurcated tubular lever 119. The latter is connected by the tubular pivot bolt 120, connecting rod 121 and tubular pivot bolt 122 to the preliminary mould slide 23. The equalizing or balancing spring 118 which also forms a safety device, is necessary on account of the different lengths of the preliminary moulds and of the impracticability of changing the cam rails 21 and 110. The tubular spindle 113 is mounted in two lateral bearings 123 which are screwed on the star-shaped cover 37.

As soon as the preliminary mould 25 has reached the glass surface, a bell-crank lever 125, and through the same a valve 126, are so operated by a tappet 124 (Fig. 3) that the vacuum in a piping 127, 128, 129 is transmitted through the valve 126 to a connecting pipe 130, and thence, through the bearing 123, tubular axis 113, the tubular lever 119, through the parts 120, 121, 122 to the slide 23, the lateral ducts 131 thereof, and openings 132 below the piston 49, which will therefore move downwards, until the annular flange of the neck plug 51 engages the inner neck mould 30. It will be understood that the tubular axis 113 is closed at its ends. In the operation of the machine the air can be withdrawn from the preliminary mould though the flange 133 bears on the inner neck mould 30, the air being withdrawn partly through the hollow neck mould and partly through vertical ducts 164 made in the wall of the neck mould and communicating with the lower inner part thereof through horizontal passages or slots.

2. After the filling has taken place, the supporting roller 61 will ascend from the partial track 107 to the circular track 63, lifting in its movement the preliminary mould and the neck mould. After these moulds have reached the highest position, a tappet 134 rocks a double-armed lever 135, and the tooth 86 is disengaged from the stop 85 by a connecting rod 136, whereupon the cocked spring 84 will throw over the knife 77 which will cut the glass "rope" under the preliminary mould 25 (Fig. 3).

3. By an opposite tappet 140, the valve 126 is changed over, and compressed air is admitted through a piping 137, 138, 139 under the piston 49, and the said compressed air will force upwards the piston 49 and the neck plug 51 and, chiefly by powerful blowing of the glass mass enclosed within the mould, expel the last traces of air between the preliminary mould and the glass mass in order to bring about a uniform cooling of the glass skin by the preliminary mould (Fig. 1). During this preliminary blowing action, the knife 77 is in a position to close the inlet of the preliminary-mould. Thereafter the valve 126 is closed.

4. After a further turning of the rotary frame, the lever 135 is turned further by an adjustable projection or cam of the rail 134, owing to which the bell crank lever 87, will press down by means of the connecting rod 136 the spindle 78 and the leaf spring 79, and thereby retract the knife 77 away from the usual preliminary mould inlet opening.

5. The pressure roller 91 of the main mould then engages with the cam surface 26 and opens the main mould 27 which thus releases the bottle produced during the preceding rotation of the machine, which bottle is now removed by a suitable mechanism (not shown) and carried away for cooling (Figs. 5 and 6). During this movement the roller 114 has cleared the cam 110. However, the vertical position of the slide of the neck mould is not changed, because the neck mould and the slide are supported on the preliminary mould. Such clearing of the cam 110 by the roller 114 and reengagement thereof on a cam face of even height is necessary only in order to permit the spring 118 to expand and to be compressed again without shock when the roller passes from the fixed cam to the adjustable cam.

6. The roller 68 of the preliminary mould arms 34 engages the cam face 24 for opening the preliminary mould (Figs. 1 and 6). Simultaneously the stop 83 rocks the lever 82 and the blade 77 sidewise and puts the spring 84 under tension, whereupon the nose 86 engages at the rear of the stop 85 in order to prevent the blade from being prematurely rocked into initial position when afterwards closing the preliminary mould.

As has been explained above under heading 5 the roller 114 has before been brought into engagement with its cam, which is necessary because otherwise the neck mould would move downwards when opening the preliminary mould sections.

7. After the preliminary mould has been completely opened the roller 114 leaves the cam 21, whereupon the neck mould 22 and the glass rope sink on the open final mould. Therefore the cams 110 and 21 are practically a single cam which, however, appears to be discontinuous, because the cam section 21 must be angularly adjustable relatively to the cam section 110.

8. The main mould 27 is closed round the glass block.

9. The valve 126 is so operated by the circular projection 140 that compressed air is again admitted under the piston 49, and the roughly formed glass block is blown through its mouthpiece.

10. If seamless bottles are to be manufactured the main mould 27 is again slightly opened after a slight blowing of the bottle, for example by means of a second cam corresponding to cam 26.

11. The lever 29 (Fig. 1) is thereupon turned down by a projection 141 and thus turned about the spindle 142 fixed to the track 40, so that its T-shaped part 143 presses against a lateral projection 144 of the connecting rod 145 (Figs. 1, 5, 8). During the longitudinal movement of the latter a nose 146 provided thereon engages in a slot 165 of the central part 30 of the neck mould 22 and turns the bottle through a small angle.

12. The main mould is closed again.

13. The previously shut off compressed air piping is again opened, and the bottle subjected to powerful blowing whereby the seam which has been produced by the first blowing operation, and which is now turned to the side, is pressed smooth.

14. The main mould is again opened, and the neck mould 30 turned back by the lever 29.

15. The final mould 27 is now closed. Without interfering with the blowing operation the preliminary mould 25 is temporarily closed for permitting the roller to pass from the adjustable segment to the fixed segment, the roller 68 slowly running downwards from the cam face 24, ascending on the corresponding cam face 168 of the fixed segment 111, and reopening the preliminary mould, so that afterwards the neck mould can be moved upwards between the sections of the preliminary mould.

16. Owing to the upward movement of the lever 29 under the action of the tappet 28, the fingers 147 of the pressure spindles 45 engaging behind the T-shaped part 143 are pulled back, so that the neck moulds are opened and the bottle neck is released (Figs. 1 and 7).

17. The roller 114 rises on the cam rail 110 (Figs. 3 and 6) and pulls upwards the slide 23 with the neck mould 22 until the projections 56 engage under the preliminary mould arms 34 (Fig. 5). The neck mould sections 22 are closed again by the spring 46 as the projections 147 have released the T-shaped part 143 of the lever 29.

18. The preliminary mould sections are closed under the neck mould 22, and both are again ready to receive liquid glass.

The cooling air required for the moulds passes through a rising pipe 148 (Figs. 3 and 5) to the hollow star-shaped cover 37 and thence into the vertical supports 32 from which it passes through lateral openings 149 (Fig. 4) through the sliding jaws 35 (Fig. 3) into the support 36 of the main mould 27, and to a nozzle (not shown) for cooling the mould from without, as is necessary in some cases. Larger preliminary moulds 25 are given the required outer cooling by means of jointed cooling pipes 166 (Fig. 6) which are secured at 150 (Figs. 2 and 6) to the supports 32.

Strippers 151 are secured to pipes 152 with thick walls, which are rockingly mounted in a double bearing 153 and supported by means of bolts or pins 154 by powerful leaf springs 155 screwed to the supports 32 (Figs. 4 and 5).

During the rotation of the machine, a roller 156 which is rotatably mounted on the upper bearing 153, after having passed the margin of the preliminary bath at 106, engages under a vertically adjustable cam track 157 and drives the stripper 151 into the glass (Fig. 5). The stripper 151 is held in radial position by a lever 158 mounted on the pipe 152 and by a projection 159 engaging with the double bearing 153 and acted upon by a spring 162. After the upper glass surface has been stripped off, the lever 158 strikes a stop 160 owing to which the latter, the pipe 152, and the stripper 151 are turned and the glass which has collected in front of the same is projected through a recess of the closing brick 161 into the furnace. The roller 156 leaves then the track 157, the spring blades 155 press the stripper 151 out of the glass, and the springs 162 cocked during the preceding rotation of the pipe 152, return the stripper to its initial position. Cooling water can be supplied to the strippers through pipes 163.

When the machine is moved away from the bath, the latter is closed by a plate, and the closing brick 161 is raised in order to enable the combustion gases of the bath to maintain the glass in the preliminary bath at a high temperature.

The term "molding means" as used in the appended claims is not intended to include the air as an element which enters into the molding operation, it being understood that such term has reference more particularly to the instrumentalities in which the glass is introduced for the purpose of molding into form.

I claim:

1. Automatic glass blowing apparatus for blowing articles of different sizes comprising, in combination, gathering and molding means, means for controlling the suction operation of said gathering means, separate means for controlling the sequential movements of the molding means, and a means to adjust all said separate means to vary the interval between the suction and said sequential movements of the molding means to suit the size of the article to be produced.

2. Automatic glass blowing apparatus for blowing articles of different sizes comprising, in combination, a support including a stationary section and a shiftable section, suction controlling means on said stationary part, gathering and molding means, means on said shiftable section for controlling the sequential movements of said gathering and molding means following the suction operation, and means for shifting said shiftable section to vary the interval between suction and the sequential movements of the molding means to suit the size of article to be produced.

3. Automatic glass blowing apparatus for blowing articles of different sizes comprising, in combination, a basin containing molten glass, a rotary support arranged for angular movement relative to said basin, gathering and molding means on said support, automatic means for controlling the operative steps of one of said means after the other with a predetermined interval between the two operations, and means for simultaneously adjusting the sequential steps of one of said means in relation to the point of gathering to vary said interval to adapt same to the different rate of cooling of different kinds of products to be blown.

4. Automatic glass blowing apparatus for blowing articles of different sizes comprising, in combination, a basin containing molten glass, a rotary support arranged for angular movement relative to said basin, gathering and molding means on said support, automatic means comprising instrumentalities for controlling first the operation of one of said means and after a predetermined angular movement of said support also the operation of the other means, and a single control means for varying the extent of said movement and the sequential operation of said other means to adapt same to the different rate of cooling of the different kinds of products to be blown.

5. Automatic glass blowing apparatus comprising, in combination, a central structure, a support arranged for rotary movement around said structure, gathering and molding means on said support, a carrier angularly displaceable relative to and about said structure, means on said structure for controlling the operation of said gathering means and means on said carrier for controlling the operations of said molding means, and means for adjusting the carrier relative to the support.

6. Automatic glass blowing apparatus for blowing articles of different sizes comprising, in combination, a central structure including a stationary section and an adjustable section, a support arranged for rotary movement around said structure, gathering and molding means on said support comprising molds, means on the stationary section of the central structure for operating one of said means and means on the movable section for operating the molds of the other of said means, and a setting means for shifting the adjustable section to thereby adjust the respective operating means and consequently the interval between the gathering and molding operations.

7. Automatic glass blowing machine comprising in combination, an adjustable carrier, a suction mold movable about said carrier in a closed horizontal path, and a plurality of actuating means on said carrier for controlling some of the operations of said machine which follow the filling of said suction mold with glass, said carrier with its actuating means being bodily shiftable relative to the point of suction.

8. Automatic glass blowing machine comprising in combination, a central structure, a carrier adjustable relative to said structure, blank and blowing molds movable about said structure, means on said structure for controlling the filling of said blank mold and means on said carrier for controlling the opening and closing of said blank mold after it has been filled and opening and closing of the blowing mold prior to final blowing operation.

9. Automatic glass blowing machine comprising in combination, a tank and basin containing molten glass, means movable relative to said basin for gathering some of the molten glass and vertically adjustable means independent of and preceding said gathering means for removing the upper glass layer from the basin and returning it to the tank.

10. Automatic glass blowing machine comprising in combination, a tank containing molten glass, a suction mold arranged to be lowered into contact with the glass in said tank, vertically adjustable skimming means arranged in front and independent of said suction mold and means for operating said skimming means so as to cause the upper layer of glass to be removed and hot, more thinly fluid glass to be exposed for contact with said suction mold, and actuating means for operating the skimming means to effect displacement of the skimmed glass from the tank.

11. Automatic glass blowing machine comprising in combination, a tank containing molten glass, an open basin forming part of and projecting from said tank, a suction mold arranged to be lowered into contact with the glass in said basin, vertically adjustable skimming means arranged in front and independent of said suction mold, means for operating said skimming means to traverse said basin so as to cause the upper layer of glass to be removed from said basin and hot, more thinly fluid glass to be exposed for contact with said suction mold, and means to rotate said skimming means to displace the skimmed glass from the basin into the tank.

12. Automatic glass blowing machine comprising in combination, a central structure, a neck mold, a blank mold below said neck mold, and a finishing mold below said blank mold, all said molds being movable together about the centre of said structure, and automatic means for opening said blank mold and for lowering said neck mold towards said finishing mold across said opened blank mold.

13. Automatic glass blowing machine comprising in combination, a suction mold movable both in horizontal and vertical direction, a track for said mold to travel on and means for vertically adjusting part of said track relative to another part.

14. In a bottle blowing machine, a final-mold including a sectional main-mold and a neck mold, means for applying a short preliminary blowing and then a final blowing, and means for automatically opening the final-mold between the two periods of blowing and simultaneously rotating the neck mold carrying the bottle to shift the preliminarily formed seam, to thus produce a seamless bottle.

15. The method herein described of making seamless bottles consisting in preliminarily blowing the parison while suspended in the sectional main-mold by the neck mold, then opening the main-mold and relatively rotating the main-mold and the neck mold to shift the preliminarily formed seam, then closing the main-mold and then completing the blowing.

16. In a bottle-blowing machine of the type set forth, a series of final-molds, a series of preliminary molds arranged in a plane above said final-molds, each pair of halves of said preliminary molds being mounted on separable arms, means for automatically separating said arms, a series of neck molds and means whereby these neck molds carrying the blanks are automatically lowered between the open preliminary mold arms into the open final-molds.

17. A glass bottle blowing machine of the type set forth embodying a vertical hinge-spindle for each pair of the final mold halves, these hingle-spindles being mounted on the bed plate of the machine, a supporting plate for the mold halves adjustable vertically independently of said spindles, and means whereby these supporting plates may be vertically adjusted so that final-molds of widely varying sizes may be used, for the purpose set forth.

18. Automatic glass blowing machine comprising in combination, a tank containing molten glass, means movable relative to said basin for gathering some of the molten glass, vertically adjustable means independent of and preceding said gathering means for removing the upper glass layer and means for imparting to said glass removing means an angular movement whereby the removed glass is expelled from said tank.

In testimony whereof I hereunto affix my signature.

HANS HILLMANN.